US010382356B2

(12) United States Patent
Sridhar et al.

(10) Patent No.: US 10,382,356 B2
(45) Date of Patent: Aug. 13, 2019

(54) SCHEDULING TRANSMISSIONS OF ADAPTIVE BITRATE STREAMING FLOWS

(71) Applicants: Kamakshi Sridhar, Plano, TX (US); Jonathan Segel, Ottawa (CA); Charles R. Payette, Oceanport, NJ (US); Zulfiquar Sayeed, Hightstown, NJ (US); Edward Grinshpun, Freehold, NJ (US)

(72) Inventors: Kamakshi Sridhar, Plano, TX (US); Jonathan Segel, Ottawa (CA); Charles R. Payette, Oceanport, NJ (US); Zulfiquar Sayeed, Hightstown, NJ (US); Edward Grinshpun, Freehold, NJ (US)

(73) Assignees: Nokia of America Corporation, Murray Hill, NJ (US); Alcatel Lucent, Nozay (FR)

( * ) Notice: Subject to any disclaimer, the term of this patent is extended or adjusted under 35 U.S.C. 154(b) by 271 days.

(21) Appl. No.: 15/292,486

(22) Filed: Oct. 13, 2016

(65) Prior Publication Data

US 2018/0109468 A1   Apr. 19, 2018

(51) Int. Cl.
*H04L 1/00* (2006.01)
*H04L 5/00* (2006.01)
*H04L 29/06* (2006.01)
*H04W 28/02* (2009.01)
(Continued)

(52) U.S. Cl.
CPC .......... *H04L 47/806* (2013.01); *H04L 1/0002* (2013.01); *H04L 1/0014* (2013.01);
(Continued)

(58) Field of Classification Search
None
See application file for complete search history.

(56) References Cited

U.S. PATENT DOCUMENTS 7,423,990 B2 * 9/2008 Kelton ............... H04N 7/17318
348/E7.071
9,461,696 B1 * 10/2016 Baker .................... H04B 1/401
(Continued)

OTHER PUBLICATIONS

International Search Report and Written Opinion mailed in corresponding PCT Application No. PCT/US2017/056466, dated Feb. 1, 2018, 13 pages.

*Primary Examiner* — Younes Naji
(74) *Attorney, Agent, or Firm* — Tong, Rea, Bentley & Kim, LLC (57) ABSTRACT

The present disclosure generally discloses a scheduling control capability for controlling scheduling of transmissions where adaptive bitrate streaming is used for delivery of content (e.g., video content or other types of content which may be streamed using adaptive bitrate streaming) from source devices to end devices. The scheduling control capability may be configured to control scheduling of transmissions of adaptive bitrate streaming flows based on priority levels assigned to the adaptive bitrate streaming flows. The scheduling control capability may be configured to dynamically control the priority levels assigned to the adaptive bitrate streaming flows. The scheduling control capability may be configured to dynamically control the priority levels assigned to the adaptive bitrate streaming flows, for use in controlling the scheduling of transmissions of the adaptive bitrate streaming flows, in manner for improving user quality-of-experience, in a manner for improving spectral efficiency, or the like, as well as various combinations thereof.

18 Claims, 5 Drawing Sheets

(51) Int. Cl.
*H04L 12/815* (2013.01)
*H04L 12/833* (2013.01)
*H04L 12/911* (2013.01)
*H04L 12/927* (2013.01)

(52) U.S. Cl.
CPC ............ *H04L 5/006* (2013.01); *H04L 47/225* (2013.01); *H04L 47/2458* (2013.01); *H04L 47/826* (2013.01); *H04L 65/602* (2013.01); *H04W 28/0205* (2013.01)

(56) References Cited

U.S. PATENT DOCUMENTS

| | | | |
|---|---|---|---|
| 2003/0054829 A1* | 3/2003 | Moisio | H04W 72/10 455/452.1 |
| 2004/0054766 A1* | 3/2004 | Vicente | H04L 41/046 709/223 |
| 2004/0213156 A1 | 10/2004 | Smallwood et al. | |
| 2004/0218545 A1 | 11/2004 | Pedersen | |
| 2007/0280181 A1* | 12/2007 | Matsuo | H04L 1/0002 370/338 |
| 2009/0135778 A1* | 5/2009 | Lee | H04W 72/1231 370/329 |
| 2009/0241005 A1* | 9/2009 | Hong | H04L 1/1835 714/749 |
| 2012/0195362 A1* | 8/2012 | Benno | H04N 21/222 375/240.01 |
| 2014/0080536 A1 | 3/2014 | Shiizaki et al. | |
| 2014/0162715 A1* | 6/2014 | Pak | H04W 16/14 455/512 |
| 2015/0312867 A1* | 10/2015 | Cui | H04W 52/0206 455/68 |
| 2016/0156563 A1* | 6/2016 | Timner | H04W 28/0289 370/230 |

\* cited by examiner

SCHEDULING TRANSMISSIONS OF ADAPTIVE BITRATE STREAMING FLOWS

TECHNICAL FIELD

The present disclosure relates generally to communication systems and, more particularly but not exclusively, to scheduling transmissions of adaptive bitrate streaming flows in communication systems.

BACKGROUND

The use of adaptive bitrate streaming to deliver content items to client devices continues to grow. While the use of adaptive bitrate streaming to deliver content items to client devices generally tends to provide improved quality-of-experience (QoE) for users of the client devices, existing adaptive bitrate streaming techniques may still result in insufficient QoE for users of the client devices under certain conditions. Additionally, existing adaptive bitrate streaming techniques also may result in insufficient spectral efficiency where adaptive bitrate streaming is used for transmissions over the air interface in wireless communication networks.

SUMMARY

The present disclosure is generally related to scheduling transmissions of adaptive bitrate streaming flows in communication systems.

In at least some embodiments, an apparatus is provided. The apparatus includes a processor and a memory communicatively connected to the processor. The processor is configured to determine a target flow rate of an adaptive bitrate streaming flow. The processor is configured to determine a measured flow rate of the adaptive bitrate streaming flow. The processor is configured to determine whether to modify a priority of the adaptive bitrate streaming flow based on a determination as to whether the measured flow rate of the adaptive bitrate streaming flow satisfies the target flow rate of the adaptive bitrate streaming flow. In at least some embodiments, a corresponding method is provided. In at least some embodiments, a non-transitory computer-readable storage medium stores instructions which, when executed by a computer, cause the computer to perform a corresponding method.

In at least some embodiments, an apparatus is provided. The apparatus includes a processor and a memory communicatively connected to the processor. The processor is configured to determine, for a wireless end device associated with an adaptive bitrate streaming flow responsive to a determination that a measured flow rate of the adaptive bitrate streaming flow does not satisfy a target flow rate of the adaptive bitrate streaming flow, whether the wireless end device is in a steady channel condition or a variable channel condition. The processor is configured to modify a priority of the adaptive bitrate streaming flow based on the determination as to whether the wireless end device is in a steady channel condition or a variable channel condition. In at least some embodiments, a corresponding method is provided. In at least some embodiments, a non-transitory computer-readable storage medium stores instructions which, when executed by a computer, cause the computer to perform a corresponding method.

BRIEF DESCRIPTION OF THE DRAWINGS

The teachings herein can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure generally discloses a scheduling control capability for controlling scheduling of transmissions where adaptive bitrate streaming (which also may be referred to herein as adaptive streaming) is used for delivery of content (e.g., video content or other types of content which may be streamed using adaptive bitrate streaming) from source devices to end devices. The scheduling control capability may be configured to control scheduling of transmissions of adaptive bitrate streaming flows based on priority levels assigned to the adaptive bitrate streaming flows. The scheduling control capability may be configured to dynamically control the priority levels assigned to the adaptive bitrate streaming flows. The scheduling control capability may be configured to dynamically control the priority levels assigned to the adaptive bitrate streaming flows, for use in controlling the scheduling of transmissions of the adaptive bitrate streaming flows, in manner for improving user quality-of-experience (QoE), in a manner for improving spectral efficiency (SE), or the like, as well as various combinations thereof.

Various embodiments of the scheduling control capability may be configured to improve or optimize performance of content streaming where content is streamed using adaptive bitrate streaming.

Various embodiments of the scheduling control capability may be configured to improve or optimize end user QoE where adaptive bitrate streaming is used for delivery of content to the end users. Various embodiments of the scheduling control capability may be configured to improve or optimize end user QoE by ensuring a consistent delivery rate for the content (which prevents the content from freezing during presentation of the content (buffer underrun) or from switching quickly between quality levels).

Various embodiments of the scheduling control capability may be configured to improve or optimize SE where adaptive bitrate streaming is used for delivery of content to the end users via wireless access networks. Various embodiments of the scheduling control capability may be configured to improve or optimize SE by opportunistically sending content to the end devices in bursts while the end devices are in relatively good channel conditions.

Various embodiments of the scheduling control capability may be configured to improve or optimize end user QoE and to improve or optimize SE (i.e., the embodiments for improving or optimizing end user QoE and the embodiments for improving or optimizing SE may be used together or may be used independently of each other).

Various embodiments of the scheduling control capability may be configured to improve or optimize end user QoE and/or SE for various types of adaptive bitrate streaming solutions (e.g., Hypertext Transfer Protocol (HTTP) Adaptive Streaming (HAS), Dynamic Adaptive Streaming over HTTP (DASH), APPLE HTTP Live Streaming, MICROSOFT SMOOTHSTREAMING, ADOBE FLASH, or the like), for various types of end devices (e.g., end user devices, machine-type-communication (MTC) devices, Internet-of-Things (IoT) devices), or the like), without requiring signaling from the content source or the content client (although it will be appreciated that such signaling may be used), in a manner that is network neutrality compliant, or the like, as well as various combinations thereof.

Figure 1:
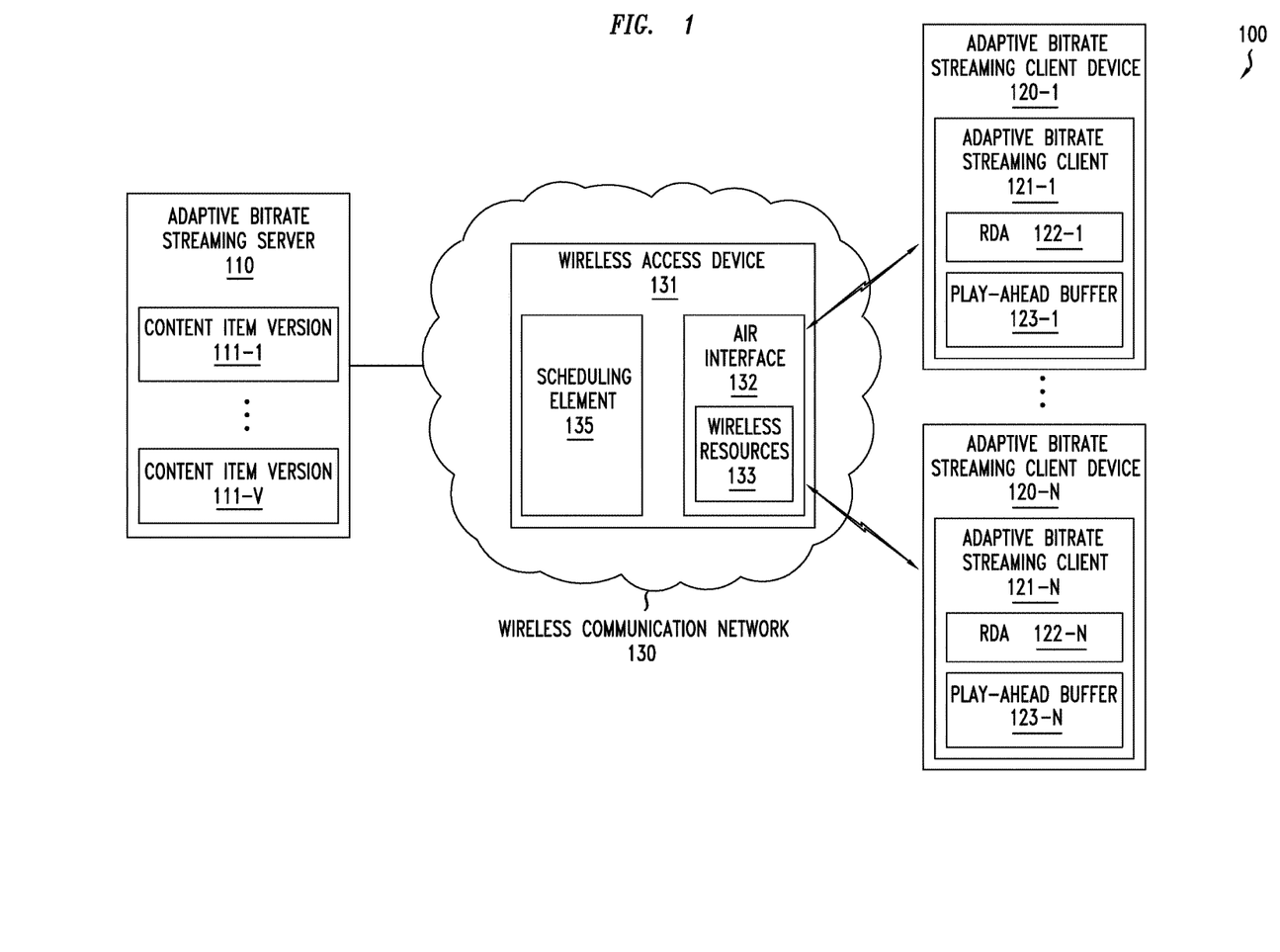
FIG. 1 depicts a communication system supporting delivery of content using adaptive bitrate streaming and including a wireless communication network configured to schedule adaptive bitrate streaming transmissions for delivery of the content using adaptive bitrate streaming.

These and various other embodiments and advantages or potential advantages of the scheduling control capability may be further understood by way of reference to the communication system of FIG. 1.

FIG. 1 depicts a communication system supporting delivery of content using adaptive bitrate streaming and including a wireless communication network configured to schedule adaptive bitrate streaming transmissions for delivery of the content using adaptive bitrate streaming.

The communication system 100 includes an adaptive bitrate streaming server 110, a set of adaptive bitrate streaming client devices 120-1-120-N (collectively, adaptive bitrate streaming client devices 120), and a wireless communication network 130.

The adaptive bitrate streaming server 110 stores a content item as a set of content item versions 111-1-111-V (collectively, content item versions 111) available for use in delivering the content item to ones of the adaptive bitrate streaming client devices 120 using adaptive bitrate streaming. The content item versions 111-1-111-V are different versions of the content item that have been encoded at V different resolutions/bitrates (and, therefore, represent V different quality levels of the content item). The content item versions 111 are each segmented into time-synchronized segments or chunks (primarily referred to herein as chunks) having mean play duration time (e.g., each of which is typically between two and ten seconds, although shorter or longer chunk lengths may be supported). It will be appreciated that (1) higher resolution/bitrate yields sharper and higher quality picture with higher video QoE, but requires more network bandwidth to deliver the chunks, whereas (2) lower resolution/bitrate requires less network throughput to deliver the segments but may lead to blocky and/or blurry picture and overall lower QoE. The content item versions 111 of the content item may be provided to the adaptive bitrate streaming server 110 (e.g., generated by the content source of the content item or generated by an encoding device disposed between the content source of the content item and the adaptive bitrate streaming server 110), generated by the adaptive bitrate streaming server 110, or the like, as well as various combinations thereof. The content item 111 may be a video content item, a multimedia content item (e.g., a combination of video and audio), or any other suitable form of content item which may be streamed using adaptive bitrate streaming and which has characteristics which may be used to support embodiments of the scheduling control capability as discussed herein). It will be appreciated that, although omitted from FIG. 1 for purposes of clarity, adaptive bitrate streaming server 110 may be configured to store multiple sets of content items versions for multiple content items, respectively.

The adaptive bitrate streaming client devices 120 are configured to request and receive (and, optionally, display) the content item available from the adaptive bitrate streaming server 110. The adaptive bitrate streaming client devices 120 are configured to request and receive the content item available from the adaptive bitrate streaming server 110 based on adaptive bitrate streaming. The adaptive bitrate streaming client devices 120-1-120-N include adaptive bitrate streaming clients 121-1-121-N (collectively, adaptive bitrate streaming clients 121), respectively, which are configured to request and receive the content item from the adaptive bitrate streaming server 110 based on adaptive bitrate streaming. The adaptive bitrate streaming clients 121-1-121-N include rate determination algorithms (RDAs) 122-1-122-N (collectively, RDAs 122), respectively, which are configured to determine, for each chunk of a content item being streamed, the particular one of the different content item versions $111_i$ from which the chunk of the content item is to be requested. The adaptive bitrate streaming client devices 120-1-120-N also include play-ahead buffers 123-1-123-N, respectively, which are configured to buffer received chunks of the content item to achieve smoother QoE during playout of the content item. The adaptive bitrate streaming client devices 120 may include any types of end devices (which, in the case of FIG. 1, are wireless end devices configured to communicate via wireless communication network 130) configured to request and receive the content item available from the adaptive bitrate streaming server 110 based on adaptive bitrate streaming. For example, the adaptive bitrate streaming client devices 120 may include wireless end user devices (e.g., smartphones, tablets, laptops, or the like), wireless MTC devices, wireless IoT devices, or the like.

The adaptive bitrate streaming server 110 and an adaptive bitrate streaming client device 120 are configured to cooperate to support adaptive bitrate streaming of the content item from the adaptive bitrate streaming server 110 to the adaptive bitrate streaming client device 120. The adaptive bitrate streaming client 121 of adaptive bitrate streaming client device 120 is configured to request chunks of the content item from the adaptive bitrate streaming server 110 where, for each chunk of the content item, the adaptive bitrate streaming client 121 may request delivery of the chunk from any of the V different content item versions $111_i$ available from the adaptive bitrate streaming server 110. The RDA 122 of the adaptive bitrate streaming client 121 is configured to determine, for each chunk of the content item, the particular one of the different content item versions $111_i$ from which the chunk of the content item is to be requested. The RDA 122 may determine, for a given chunk of the content item to be requested next, which one of the V different content item versions $111_i$ from which the chunk of the content item is to be requested based on a highest bitrate expected to be sustainable by the adaptive bitrate streaming client device 120 without impacting end user QoE experienced by a user of the adaptive bitrate streaming client device 120. The RDA 122 may determine, for a given chunk of the content item to be requested next, which one of the V different content item versions $111_i$ from which the chunk of the content item is to be requested based on the fullness of its play-ahead buffer 123 (e.g., an indication of a percentage of the capacity of the play-ahead buffer 123 that is being used for storage of chunks) and historic estimates of the network throughput. The RDA 122 may dynamically select higher or lower quality content item versions $111_i$ from which to request chunks of the content item. In other words, the RDA 122 may continually sense the available throughput and adapt the bitrate accordingly (e.g., selecting different content item versions $111_i$ based on available throughput). The typical manner in which the RDA 122 determines which one of the V different content item versions $111_i$ from which a next chunk of the content item is to be requested (e.g., based on a measure of the bandwidth available to the adaptive bitrate streaming client device 120, based on whether or not chunks are consistently delivered in a time shorter than the interval length, based on an average of time taken by the adaptive bitrate streaming client device 120 to download previous chunks of the content item, or the like, as well as various combinations thereof) will be understood by one skilled in the art. The adaptive bitrate streaming client 121 may request the chunks of the content item by sending requests for chunks of the content item versions $111_i$ as determined by the RDA 122 of adaptive bitrate streaming client 121. The adaptive bitrate streaming server 110 receives the chunk requests, for chunks of the content item with the particular content item version $121_i$ being specified for each requested chunk, from adaptive bitrate streaming client device 120 and provides the requested chunks of the content item to adaptive bitrate streaming client device 120 from the content item versions $111_i$ of the content item. The adaptive bitrate streaming client device 120 receives the requested chunks of the content item from the adaptive bitrate streaming server 110 and buffers the received chunks of the content item in the play-ahead buffer 123 for playout (e.g., via a presentation interface of the adaptive bitrate streaming client device 120 or other presentation device which may be communicatively connected to the adaptive bitrate streaming client device 120). The chunks are separated by durations of silence (e.g., typically on the order of a few seconds between chunks, although shorter or longer durations of silence may be used). In the case of HAS, for example, the durations of silence are equal to the round trip time (RTT) when the buffer is not full and the durations of silence are equal to RTT+(play_duration_of_previous_chunk-segment_download_time) when the buffer is full. The adaptive bitrate streaming supported by adaptive bitrate streaming server 110 and the adaptive bitrate streaming client device 120 may be based on any suitable adaptive bitrate streaming protocol implementation (e.g., HAS, DASH, LiveStreaming, SMOOTHSTREAMING, FLASH, or the like).

The wireless communication network 130 is configured to support transport of adaptive bitrate streaming flows from adaptive bitrate streaming server 110 to adaptive bitrate streaming client devices 120. The wireless communication network 130 may include a core wireless network portion and a radio access network (RAN) portion. The wireless communication network 130 may be any suitable type of wireless communication network which may support transport of adaptive bitrate streaming flows from adaptive bitrate streaming server 110 to adaptive bitrate streaming client devices 120. For example, the wireless communication network 130 may be a Third Generation (3G) wireless network (e.g., a Universal Mobile Telecommunications System (UMTS) network, a Code Division Multiple Access 200 (CDMA-2000) network, or the like), a Fourth Generation (4G) wireless network (e.g., a Long Term Evolution (LTE) network, an LTE-Advanced network, or the like), a Fifth Generation (5G) wireless network, or the like, as well as various combinations thereof.

The wireless communication network 130 includes a wireless access device 131 that is configured to operate as a wireless point of access for the adaptive bitrate streaming client devices 120. The access device type of the wireless access device 131 may depend on the wireless network type of the wireless communication network 130. For example, wireless access device 131 may be a base station (BS), a NodeB, an evolved NodeB (eNodeB), a 5G access device, a small cell device (e.g., a metro cell device, a pico cell device, a femto cell device, or the like), or the like. It will be appreciated that wireless communication network 130 may include various other devices and functions (which are omitted from FIG. 1 for purposes of clarity), including various other devices and functions for the RAN portion of wireless communication network 130, various other devices and functions for the core wireless network portion of wireless communication network 130, and so forth.

The wireless access device 131 includes an air interface 132 having a set of wireless resources 133 and includes a scheduling element 135 that is configured to schedule transmissions of the adaptive bitrate streaming flows to the adaptive bitrate streaming client devices 120 based on sharing of wireless resources 133 of the air interface 132.

The air interface 132 supports a set of wireless resources 133 for communications via wireless access device 131. The wireless resources 133 of air interface 132 may include downlink resources for transmissions from wireless access device 131 to adaptive bitrate streaming client devices 120 and uplink resources for transmissions from adaptive bitrate streaming client devices 120 to wireless access device 131. The wireless resources 132 of the air interface 132 may be organized and used in various ways which, it will be understood, may vary for different types of wireless access technologies. For example, in 4GLTE and 5G wireless networks, the wireless resources 133 of the air interface 132 may correspond to physical resource blocks (PRBs). It will be appreciated that other types or granularities of wireless resources may be supported in wireless resources 133 of the air interface 132.

The scheduling element 135 is configured to schedule transmissions of adaptive bitrate streaming flows to adaptive bitrate streaming client devices 120. The scheduling element 135 is configured to schedule transmissions of adaptive bitrate streaming flows to adaptive bitrate streaming client devices 120 based on priority levels assigned to the adaptive bitrate streaming flows associated with adaptive bitrate streaming client devices 120. The scheduling element 135 may be configured to ensure a consistent level of QoE under various adverse conditions (e.g., congestion conditions, variable channel conditions, or the like) by ensuring that the amount of data in each chunk is delivered within each chunk time period and/or to improve or optimize SE by using information from signal-to-interference-and-noise ratio (SINR) estimates to determine whether transmission scheduling events represent a good or poor channel quality. The scheduling element 135 may be configured to achieve such goals based on scheduler optimization functions configured to alter priority levels assigned to the adaptive bitrate streaming flows associated with adaptive bitrate streaming client devices 120 in order to allow the target flow rates to be met and the SE to be improved or optimized. An example embodiment of a method for scheduling transmissions of adaptive bitrate streaming flows is presented with respect to FIG. 3.

The scheduling element 135 may be configured to dynamically control priority levels assigned to adaptive bitrate streaming flows of adaptive bitrate streaming client devices 120. The scheduling element 135, as discussed further below, may be configured to dynamically control priority levels that are assigned to the adaptive bitrate streaming flows of adaptive bitrate streaming client devices 120 in various ways and for various purposes.

The scheduling element 135 may be configured to dynamically control the priority level assigned to adaptive bitrate streaming flows in a manner for improving or optimizing QoE. The scheduling element 135 may be configured to dynamically control the priority level assigned to a given adaptive bitrate streaming flow of a given adaptive bitrate streaming client device 120 in a manner for delivering the appropriate target flow rate for the adaptive bitrate streaming flow that is needed for consistently smooth QoE. The scheduling element 135 may be configured to dynamically control the priority level assigned to a given adaptive bitrate streaming flow of a given adaptive bitrate streaming client device 120 in a manner for ensuring a consistent level of QoE, even under adverse conditions (e.g., congestion conditions, variable channel conditions, or the like), by controlling the priority level assigned to the given adaptive bitrate streaming flow in a manner for ensuring that the amount of data in each chunk is delivered within each chunk time period. The scheduling element 135 may be configured to dynamically control the priority level assigned to a given adaptive bitrate streaming flow by ensuring that each chunk of the adaptive bitrate streaming flow is delivered within a certain time interval that is consistent with the chunk period, thereby providing an assured average rate over chunk period. The scheduling element 135 may be configured to determine whether a chunk of the adaptive bitrate streaming flow is delivered within the chunk period by determining whether a target flow rate for the adaptive bitrate streaming flow is met for that chunk period. The scheduling element 135 may be configured to determine whether a target flow rate for the adaptive bitrate streaming flow is met for that chunk period by determining the target flow rate for the adaptive bitrate streaming flow, determining a measured flow rate for the adaptive bitrate streaming flow, and determining whether the measured flow rate for the adaptive bitrate streaming flow satisfies the target flow rate for the adaptive bitrate streaming flow. The scheduling element 135 may be configured to determine whether the measured flow rate for the adaptive bitrate streaming flow satisfies the target flow rate for the adaptive bitrate streaming flow by determining whether a difference between the measured flow rate for the adaptive bitrate streaming flow and the target flow rate for the adaptive bitrate streaming flow satisfied a threshold. The scheduling element 135 may be configured to determine the target flow rate of the adaptive bitrate streaming flow by measuring the chunk size being sent out for the adaptive bitrate streaming flow and dividing the chunk size being sent out for the adaptive bitrate streaming flow over the chunk interval for the adaptive bitrate streaming flow. The scheduling element 135 may be configured to determine the target flow rate of the adaptive bitrate streaming flow by measuring the flow rate over for the adaptive bitrate streaming flow over a relatively long time interval (e.g., a time interval corresponding to several chunk durations). The scheduling element 135 may be configured to ensure that, even if the target flow rate for the adaptive bitrate streaming flow of the adaptive bitrate streaming client device 120 has to change, it is changed gradually (e.g., in a stepwise manner), rather than abruptly, thereby assuring smoother video QoE for the adaptive bitrate streaming flow of the adaptive bitrate streaming client device 120. The result of assuring consistent chunk delivery is that the play-ahead buffer 123 of the adaptive bitrate streaming client device 120 does not become depleted and that the RDA 122 of the adaptive bitrate streaming client 121 of the adaptive bitrate streaming client device 120 does not detect a network impairment that would lead it to select a lower quality chunk in future chunk periods. Thus, a smooth, uniform quality playout is assured. It is noted that, in at least some embodiments, the target flow rate assurance mechanism may be supplemented with information indicative of the fullness of the play-ahead buffer 123 of the adaptive bitrate streaming client device 120 (e.g., the information indicative of the fullness of the play-ahead buffer 123 of the adaptive bitrate streaming client device 120 may be provided from the adaptive bitrate streaming client device 120 to the scheduling element 135 and the scheduling element 135 may use the information indicative of the fullness of the play-ahead buffer 123 of the adaptive bitrate streaming client device 120 to determine the priority level that is assigned to the adaptive bitrate streaming flow of the adaptive bitrate streaming client device 120). The scheduling element 135 may be configured to provide or support various other functions for dynamically control the priority levels assigned to the adaptive bitrate streaming flows in a manner for improving or optimizing QoE.

The scheduling element 135 may be configured to dynamically control the priority levels assigned to the adaptive bitrate streaming flows in a manner for improving or optimizing SE associated with use of the wireless resources 133 of the air interface 132 to support transmissions of adaptive bitrate streaming flows to adaptive bitrate streaming client devices 120. The scheduling element 135 may be configured to dynamically control the priority levels assigned to the adaptive bitrate streaming flows in a manner for improving or optimizing SE based on determinations as to whether the adaptive bitrate streaming client devices 120 of the adaptive bitrate streaming flows are in steady or variable channel conditions. The scheduling element 135 may be configured to dynamically control the priority levels assigned to the adaptive bitrate streaming flows, in a manner for improving or optimizing SE, based on determinations as to whether ones of the adaptive bitrate streaming client devices 120 of the adaptive bitrate streaming flows that are in steady channel conditions are in good steady channel conditions or bad steady channel conditions. The scheduling element 135 may be configured to dynamically control the priority levels assigned to the adaptive bitrate streaming flows, in a manner for improving or optimizing SE, based on determinations as to whether ones of the adaptive bitrate streaming client devices 120 of the adaptive bitrate streaming flows that are in variable channel conditions have current estimated SINRs that are greater than or less than long term moving average SINRs of the adaptive bitrate streaming client devices 120. The scheduling element 135 may be configured to improve or optimize SE by dynamically controlling the priority level assigned to an adaptive bitrate streaming flow of an adaptive bitrate streaming client device 120 such that data of the adaptive bitrate streaming flow is sent to the adaptive bitrate streaming client device 120 when the adaptive bitrate streaming client device 120 has good channel conditions and data of the adaptive bitrate streaming flow is temporarily buffered for the adaptive bitrate streaming client device 120 (at wireless access device 131) until the channel conditions of the adaptive bitrate streaming client device 120 or until a time near the end of the chunk delivery window for the adaptive bitrate streaming flow. It is noted that, under variable fading conditions, all adaptive bitrate streaming client devices 120 will be unlikely to be in poor channel conditions at the same time such that there are expected to be at least some adaptive bitrate streaming client devices 120 with good channel conditions (relative to their average channel condition) and, thus, data of the adaptive bitrate streaming flows of those adaptive bitrate streaming client devices 120 with relatively good channel conditions may be transmitted to those adaptive bitrate streaming client devices 120 using less wireless resources 133 of the air interface 132. This enables more adaptive bitrate streaming flows of adaptive bitrate streaming client devices 120 to be accommodated opportunistically The scheduling element 135 may be configured to improve or optimize SE by dynamically controlling the priority levels assigned to adaptive bitrate streaming flows of adaptive bitrate streaming client devices 120 in a manner for providing bursting of data of adaptive bitrate streaming flows to adaptive bitrate streaming client devices having good channel conditions in order to optimize utilization of the wireless resources 133 of the air interface 132 (e.g., optimizing utilization of PRBs or other wireless resources). The scheduling element 135 may be configured to provide or support various other functions for dynamically control the priority levels assigned to the adaptive bitrate streaming flows in a manner for improving or optimizing SE.

Figure 2:
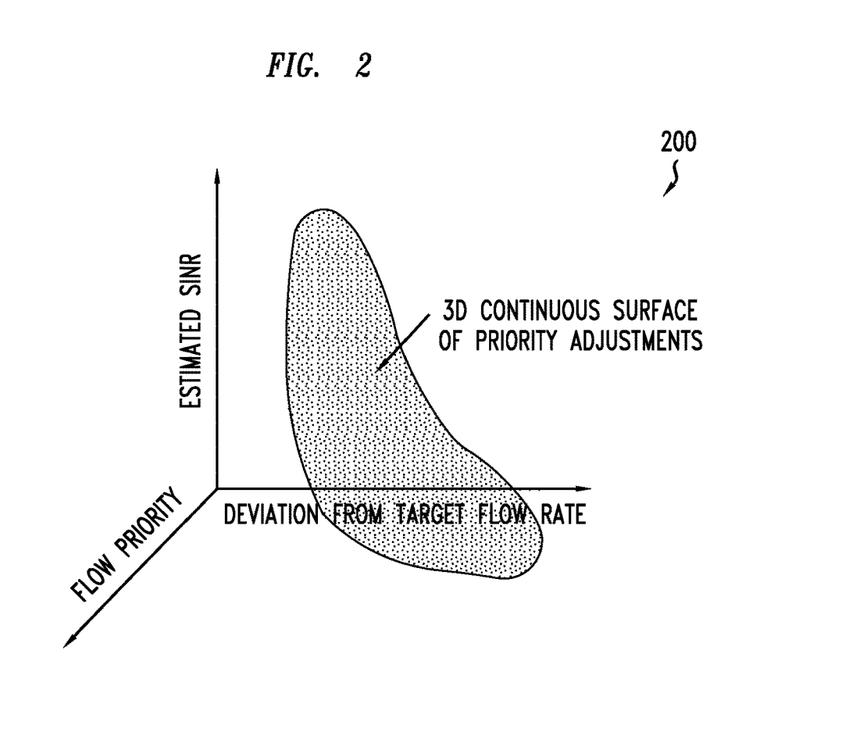
FIG. 2 depicts an exemplary representation of priority level of an adaptive bitrate streaming flow as a continuum surface that is a function a quality-of-experience optimization factor and a spectral efficiency optimization factor.

The scheduling element 135 may be configured to dynamically control the priority levels assigned to the adaptive bitrate streaming flows in a manner for both improving or optimizing QoE and improving or optimizing SE associated with use of wireless resources 133 of the air interface 132 to support transmissions of adaptive bitrate streaming flows to adaptive bitrate streaming client devices 120. Here, the control over the priority levels assigned to the adaptive bitrate streaming flows may be a function of (1) one or more factors which may be used for dynamically control the priority levels in a manner for improving or optimizing QoE (e.g., a difference between the measured flow rate for the adaptive bitrate streaming flow and the target flow rate for the adaptive bitrate streaming flow, as discussed above) and (2) one or more factors which may be used for dynamically control the priority levels in a manner for improving or optimizing SE associated with use of the wireless resources 133 of the air interface 132 to support transmissions of adaptive bitrate streaming flows to adaptive bitrate streaming client devices 120 (e.g., a comparison of current estimated SINR to a threshold SINR, such as a long term moving average SINR, as discussed herein). An exemplary representation of the priority level (which is also denoted as user priority) as a continuum surface that is a function a QoE optimization factor and an SE optimization factor is presented in FIG. 2. As depicted in FIG. 2, priority level representation 200 is a continuum surface that depicts a manner in which the priority level of an adaptive bitrate streaming flow may be determined as a function of both the difference between the measured flow rate for the adaptive bitrate streaming flow and the target flow rate for the adaptive bitrate streaming flow (i.e., the QoE optimization factor) and the comparison of the current estimated SINR to the threshold SINR (i.e., the SE optimization factor).

The scheduling element 135, as indicated above, may be configured to dynamically control the priority levels assigned to the adaptive bitrate streaming flows in a manner for both improving or optimizing QoE and for improving or optimizing SE associated with use of wireless resources 133 of the air interface 132 to support transmissions of adaptive bitrate streaming flows to adaptive bitrate streaming client devices 120. It is noted that, when these two embodiments or goals are used in combination with each other to set the priority level for an adaptive bitrate streaming flow, the two embodiments may be (1) implemented as two separate processes that assign two separate priority values for the adaptive bitrate streaming flow that are then combined in order to provide the overall priority value for the adaptive bitrate streaming flow that is used for scheduling or (2) implemented as a single process that assigns a single priority value for the adaptive bitrate streaming flow that is used for scheduling. In the former case (i.e., multiple priority levels are assigned and combined), the priority value determined for improving or optimizing QoE and the priority value determined for improving or optimizing SE may be combined in various ways (e.g., taking an average, taking a weighted average (e.g., where the QoE value may be weighted higher (e.g., if the operator is more concerned with QoE than SE) or the SE priority value may be weighted higher (e.g., if the operator is more concerned with SE than QoE)), or the like). In the latter case (i.e., a single priority level is assigned based on a combined consideration of factors related to QoE and SE), the manner (e.g., order, weighting, and so forth) in which the factors related to QoE and the factors related to SE are considered may be implemented in various ways. An example embodiment of a method configured for dynamically controlling the priority level assigned to an adaptive bitrate streaming flow at a wireless access device, using a combination of factors related to QoE and factors related to SE, is presented with respect to FIG. 4.

The scheduling element 135 may be configured to provide various other functions for scheduling transmissions of adaptive bitrate streaming flows to adaptive bitrate streaming client devices 120 based on priority levels assigned to the adaptive bitrate streaming flows associated with the adaptive bitrate streaming client devices 120.

It will be appreciated that, although primarily presented with respect to embodiments in which communication system 100 includes specific numbers and arrangements of elements (illustratively, for the adaptive bitrate streaming server 110, the adaptive bitrate streaming client devices 120, and the wireless communication network 130), communication system 100 may include various other numbers and arrangements of elements.

Figure 3:
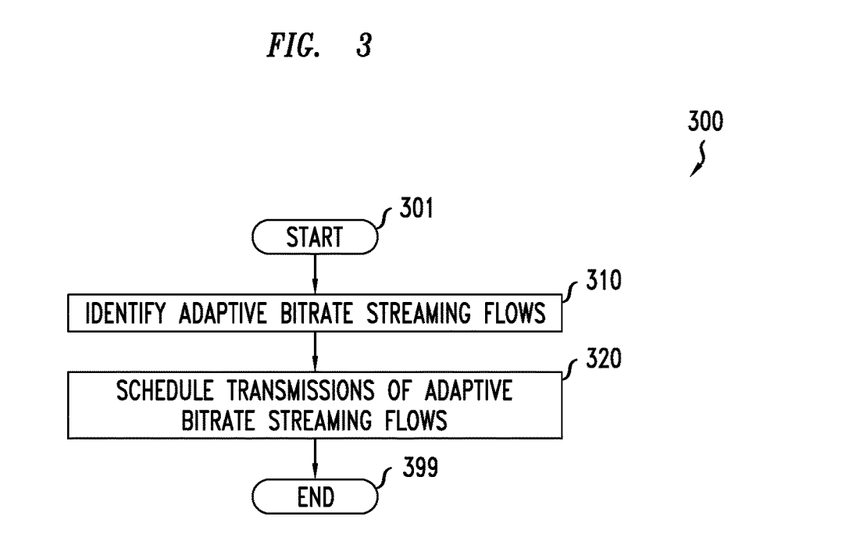
FIG. 3 depicts an embodiment of a method for scheduling transmissions of adaptive bitrate streaming flows at a wireless access device.

FIG. 3 depicts an embodiment of a method for scheduling transmissions of adaptive bitrate streaming flows at a wireless access device. It will be appreciated that, although primarily presented as being performed serially, at least a portion of the blocks of method 300 may be performed contemporaneously or in a different order than as presented in FIG. 3.

At block 301, method 300 begins.

At block 310, adaptive bitrate streaming flows are identified. The adaptive bitrate streaming flows may be identified based on information included in packet headers of packets of the adaptive bitrate streaming flows, information included in packet payloads of packets of the adaptive bitrate streaming flows, or the like, as well as various combinations thereof. The adaptive bitrate streaming flows may be identified even where the adaptive bitrate streaming flows are encrypted. (e.g., by observing characteristic traffic patterns of adaptive bitrate streaming flows). The adaptive bitrate streaming flows may be identified in various other ways.

At block 320, scheduling of transmissions of the adaptive bitrate streaming flows is performed. The scheduling of the transmissions of the adaptive bitrate streaming flows may be performed based on dynamic assignment of priority levels to the adaptive bitrate streaming flows.

The dynamic assignment of priority levels to the adaptive bitrate streaming flows may include, for each of the adaptive bitrate streaming flows, assigning a relatively high priority level to the adaptive bitrate streaming flow at the beginning of the adaptive bitrate streaming flow in order to (1) perform initial client buffer fill to fill up the client buffer of the adaptive bitrate streaming flows to an initial target (e.g., some threshold percentage of the total buffer space for the adaptive bitrate streaming flow) and (2) enable determination of a target flow rate for the adaptive bitrate streaming flow. It will be appreciated that the initial client buffer fill may take on the order of a few seconds or even tens of seconds.

The dynamic assignment of priority levels to the adaptive bitrate streaming flows may include, for each of the adaptive bitrate streaming flows, dynamically modifying the priority level of the adaptive bitrate streaming flow in a manner for improving or optimizing QoE (e.g., assuring consistent flow rate for the remaining duration of the adaptive bitrate streaming flow), in a manner for improving or optimizing SE, or the like, as well as various combinations thereof. As noted above, an example embodiment of a method configured for dynamically controlling the priority level assigned to an adaptive bitrate streaming flow is presented with respect to FIG. 4.

At block 399, method 300 ends.

Figure 4:
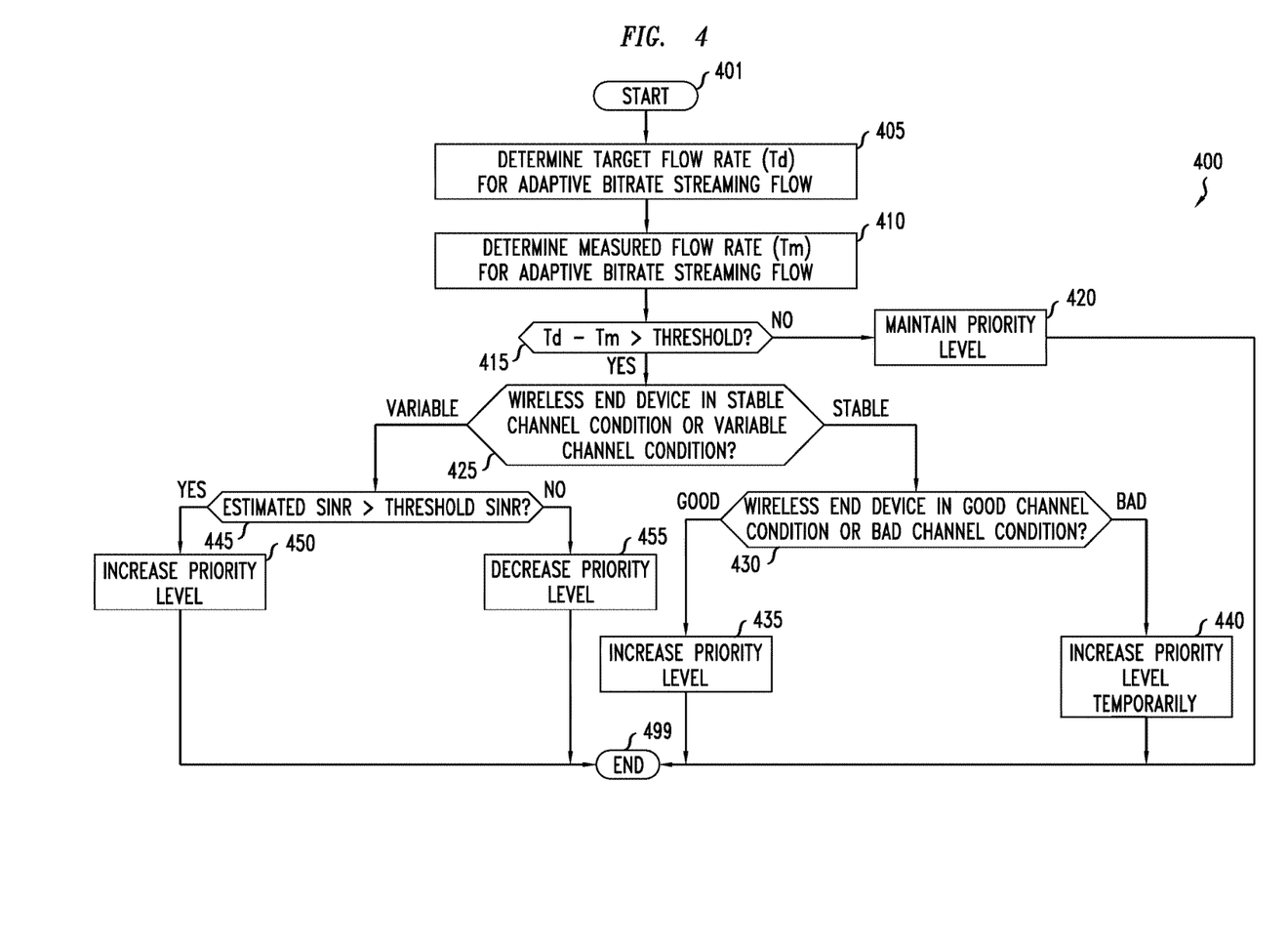
FIG. 4 depicts an embodiment of a method for dynamically controlling the priority level assigned to an adaptive bitrate streaming flow at a wireless access device.

FIG. 4 depicts an embodiment of a method for dynamically controlling the priority level assigned to an adaptive bitrate streaming flow at a wireless access device. It will be appreciated that, although primarily presented as being performed serially, at least a portion of the blocks of method 400 may be performed contemporaneously or in a different order than as presented in FIG. 4.

At block 401, method 400 begins.

At block 405, a target flow rate is determined for the adaptive bitrate streaming flow. The target flow rate also may be referred to herein as Td. The target flow rate for the adaptive bitrate streaming flow may be set by dividing the maximum allocated flow rate available at the wireless access device among the adaptive bitrate streaming flows served by the wireless access device. The target flow rate for the adaptive bitrate streaming flow may be computed based on cell congestion status, radio channel conditions, or the like, as well as various combinations thereof. It is noted that (1) if the target flow rate for the adaptive bitrate streaming flow is set too high then the other adaptive bitrate streaming flows will not get adequate spectrum resources and, thus, QoE will suffer, whereas (2) if the target flow rate for the adaptive bitrate streaming flow is set too low then the video quality level for the adaptive bitrate streaming flow will be poor. Accordingly, the target flow rate for the adaptive bitrate streaming flow may be set at just the right level, appropriate for the congestion level, so as to minimize stalls (the number of rebuffering events) for the adaptive bitrate streaming flow and quality level changes for the adaptive bitrate streaming flow and, further, so as to maintain a sustainable quality level for all adaptive bitrate streaming flows associated with users in congestion conditions. The target flow rate for the adaptive bitrate streaming flow may be modified dynamically over time (e.g., the target flow rate for the adaptive bitrate streaming flow may be reduced gradually as the congestion level increases and may be increased as the congestion level decreases). The target flow rate may be set or modified in various other ways. From block 405, method 400 proceeds to block 410.

At block 410, a measured flow rate is determined for the adaptive bitrate streaming flow. The measured flow rate also may be referred to herein as Tm. The measured flow rate for the adaptive bitrate streaming flow may be measured in the post-buffer-fill 'throttling phase' of the adaptive bitrate streaming flow. The measured flow rate for the adaptive bitrate streaming flow may be measured in the post-buffer-fill 'throttling phase' of the adaptive bitrate streaming flow by temporarily giving a high priority to the adaptive bitrate streaming flow, measuring the chunk size being sent out for the adaptive bitrate streaming flow, and dividing the chunk size being sent out for the adaptive bitrate streaming flow over the chunk interval for the adaptive bitrate streaming flow. The measured flow rate may be measured in various other ways. From block 410, method 400 proceeds to block 415.

At block 415, a determination is made as to whether the measured flow rate for the adaptive bitrate streaming flow satisfies the target flow rate for the adaptive bitrate streaming flow. This may be a determination as to whether a difference between the target flow rate for the adaptive bitrate streaming flow and the measured flow rate for the adaptive bitrate streaming flow satisfies a threshold.

If a determination is made that the measured flow rate for the adaptive bitrate streaming flow satisfies the target flow rate for the adaptive bitrate streaming flow (e.g., Td−Tm<threshold), which indicates that the target flow rate for the adaptive bitrate streaming flow has been met, method 400 proceeds to block 420. Here, no additional action of providing additional scheduling resources for the adaptive bitrate streaming flow is needed (rather, scheduling for the adaptive bitrate streaming flow is performed based on the default priority level for the adaptive bitrate streaming flow).

If a determination is made that the measured flow rate for the adaptive bitrate streaming flow does not satisfy the target flow rate for the adaptive bitrate streaming flow (e.g., Td−Tm>threshold), which indicates that the target flow rate for the adaptive bitrate streaming flow has not been met, method 400 proceeds to block 425. Here, the priority level of the adaptive bitrate streaming flow may need to be modified (e.g., increased or decreased as discussed further with respect to steps 425-455), since a preferential allocation of scheduling resources may be needed across the adaptive bitrate streaming flow and other adaptive bitrate streaming flows.

At block 420, based on a determination that the measured flow rate for the adaptive bitrate streaming flow satisfies the target flow rate for the adaptive bitrate streaming flow (e.g., Td−Tm<threshold), the priority level of the adaptive bitrate streaming flow is maintained (i.e., it is not changed but, rather, remains at the default priority level). From block 420, method 400 proceeds to block 499, where method 400 ends.

At block 425, a determination is made as to whether the wireless end device of the adaptive bitrate streaming flow is in a steady channel condition or a variable channel condition. In general, a variable channel condition means that the wireless end device is experiencing fluctuating channel conditions. The determination as to whether the wireless end device of the adaptive bitrate streaming flow is in a steady channel condition or a variable channel condition may be based on variability of SINR measurements associated with the wireless end device.

If a determination is made that the wireless end device of the adaptive bitrate streaming flow is in a steady (or stable)

channel condition, method 400 proceeds to block 430. Here, it is noted that, while the wireless end device is in good channel conditions, it is possible to take advantage of the channel fluctuations to improve or optimize SE. The SE may be improved or optimized through efficient allocation of spectral resources (e.g., Physical Resource Blocks (PRBs) in LTE wireless systems or other similar types of wireless resources in other types of wireless systems) across the wireless end devices competing for the common pool of spectral resources.

If a determination is made that the wireless end device of the adaptive bitrate streaming flow is in a variable channel condition, method 400 proceeds to block 445.

At block 430, based on a determination that the wireless end device of the adaptive bitrate streaming flow is in a steady channel condition, a determination is made as to whether the wireless end device of the adaptive bitrate streaming flow is in good steady channel condition or is in bad steady channel condition. This determination may be based on a determination as to whether an SINR measurement associated with the wireless end device exceeds an SINR threshold.

If a determination is made that the wireless end device of the adaptive bitrate streaming flow is in a good steady channel condition, method 400 proceeds to block 435.

If a determination is made that the wireless end device of the adaptive bitrate streaming flow is in a bad steady channel condition, method 400 proceeds to block 440.

At block 435, based on a determination that the wireless end device of the adaptive bitrate streaming flow is in a good steady channel condition, and based on the determination that the measured flow rate for the adaptive bitrate streaming flow does not satisfy the target flow rate for the adaptive bitrate streaming flow (in block 415), the priority level of the adaptive bitrate streaming flow is increased. The priority level of the adaptive bitrate streaming flow is increased so that the adaptive bitrate streaming flow will receive sufficient wireless resources (e.g., PRBs or others) to maintain a desired target flow rate (e.g., for enabling the measured flow rate for the adaptive bitrate streaming flow to be within a threshold amount of the target flow rate for the adaptive bitrate streaming flow). From block 435, method 400 proceeds to block 499, where method 400 ends.

At block 440, based on a determination that the wireless end device of the adaptive bitrate streaming flow is in bad steady channel conditions, and based on the determination that the measured flow rate for the adaptive bitrate streaming flow does not satisfy the target flow rate for the adaptive bitrate streaming flow (in block 415), the priority level of the adaptive bitrate streaming flow is temporarily increased (e.g., for a few (Tk) cycles). Here, it may be that the wireless end device is in deep fade or is in cell edge, in which case it is still worthwhile to increase the user priority for a few cycles to give the adaptive bitrate streaming flow additional wireless resources (e.g., PRBs or others) even if the SE is not optimized. If, after a few (Tk) cycles, the measured flow rate for the adaptive bitrate streaming flow still does not increase, then it is determined that this wireless end device cannot be helped because it is in very adverse channel conditions and helping this wireless end device at the expense of other wireless end devices would result in disproportianal allocation of wireless resources and, thus, cause the user QoE of other adaptive bitrate streaming flows to suffer.

At block 445, a determination is made as to whether a current estimated SINR of the wireless end device is greater than or less than a long term moving average SINR of the wireless end device. This determination may be used to improve or optimize SE.

The current estimated SINR of the wireless end device and the long term moving average SINR of the wireless end device may be determined based on SINR measurement information associated with the wireless end device. The SINR measurement information associated with the wireless end device may include SINR measurements available from the wireless end device at certain intervals through certain types of channel quality measurements. For example, in an LTE network, SINR samples of a UE are available from the UE, typically at intervals of 40 ms, through LTE CQI measurements. The SINR measurement information associated with the wireless end device also may include interpolations of SINR measurements available from the wireless end device. For example, in an LTE network, it is possible to estimate the current SINR between CQI intervals based on such interpolation. The current estimated SINR of the wireless end device may be determined based on the SINR measurement information. The long term moving average SINR of the wireless end device may be computed over a time period (e.g., 200 ms, 400 ms, or the like). The time period may be configurable. It will be appreciated that the long term moving average SINR will indicate SINR trends.

If a determination is made that the current estimated SINR of the wireless end device is greater than the long term moving average SINR of the wireless end device, method 400 proceeds to block 450.

If a determination is made that the current estimated SINR of the wireless end device is less than the long term moving average SINR of the wireless end device, method 400 proceeds to block 455.

At block 450, based on a determination that the current estimated SINR of the wireless end device is greater than the long term moving average SINR of the wireless end device (which indicates a unique opportunity to improve or optimize SE), the priority level of the adaptive bitrate streaming flow is increased. The priority level of the adaptive bitrate streaming flow is increased so that a burst of wireless resources (e.g., PRBs or others) will be assigned to the adaptive bitrate streaming flow so that the chunk bits can be delivered to the wireless end device while the wireless end device is in favorable channel conditions. From block 450, method 400 proceeds to block 499 (where the method 400 ends).

At block 455, based on a determination that the current estimated SINR of the wireless end device is less than the long term moving average SINR of the wireless end device (which indicates a unique opportunity to improve or optimize SE), the priority level of the adaptive bitrate streaming flow is decreased. This enables the wireless access device to buffer the data of the adaptive bitrate streaming flow for some time (i.e., such that the data is not sent) until the wireless end device is in better channel conditions. This is possible and allowable because streaming video traffic is relatively delay insensitive (up to a few seconds). Sending the data while the wireless end device in poor channel conditions will cause SE to be reduced and must be avoided. In contrast, sending data while the wireless end device in good channel conditions will help optimize SE. From block 455, method 400 proceeds to block 499 (where the method 400 ends).

It is noted that this mechanism for sending data in bursts when channel conditions are good (for improving SE) may need to be balanced against the QoE objective (which, as indicated above, requires a consistent delivery rate over the chunk period). Thus, at some point late in the chunk period, the adaptive bitrate streaming flow of the wireless end device may need to be scheduled even if the SINR of the wireless end device is poor (otherwise, the measured flow rate will fall such that the difference between the target flow rate and the measured flow rate falls below the threshold).

At block 499, method 400 ends.

It is noted that, with the scheme of method 400 of FIG. 4, the scheduler gives preferential allocation of scheduler resources (by increasing user priority) based on the SINR estimates. The scheduler does so by picking the wireless end device in good channel conditions and later assigning more spectral resources to other wireless end devices in good channel conditions. It is further noted that fairness is maintained because, if there are at least a few wireless end devices that are in variable channel conditions, then the scheduler will be able to rotate amongst these wireless end devices based on the SINR estimates associated with the wireless end devices, all the while optimizing the ability to deliver bits in an optimal manner over the radio interface.

It is further noted that the scheme of method 400 of FIG. 4 is expected to perform better than guaranteed bit rate (for QoE) and better than standard weighted fair queuing scheduling (for SE), because (1) current weighted fair queuing mechanisms ensure fairness over short time scales but are not necessarily optimal over longer time durations as in the scheme of method 400 of FIG. 4 (e.g., the scheme of method 400 of FIG. 4 may take advantage of deep buffering, suspending delivery to a wireless end device over time scales are that outside of time scale within which guaranteed bit rate and weighted fair queuing mechanisms work (e.g., for thousands of 1 ms TTI resource allocation decision times) and (2) balances the need for assured delivery rate with the opportunity for SE improvement.

It will be appreciated that, as indicated above, various portions of method 400 of FIG. 4 may be used independently of other portions of method 400 of FIG. 4 for dynamically controlling the priority level assigned to an adaptive bitrate streaming flow at a wireless access device. For example, a method may be configured to dynamically control the priority level assigned to an adaptive bitrate streaming flow in a manner for improving or optimizing QoE (e.g., as presented with respect to FIG. 5), for improving or optimizing SE (e.g., as presented with respect to FIG. 6), or the like.

Figure 5:
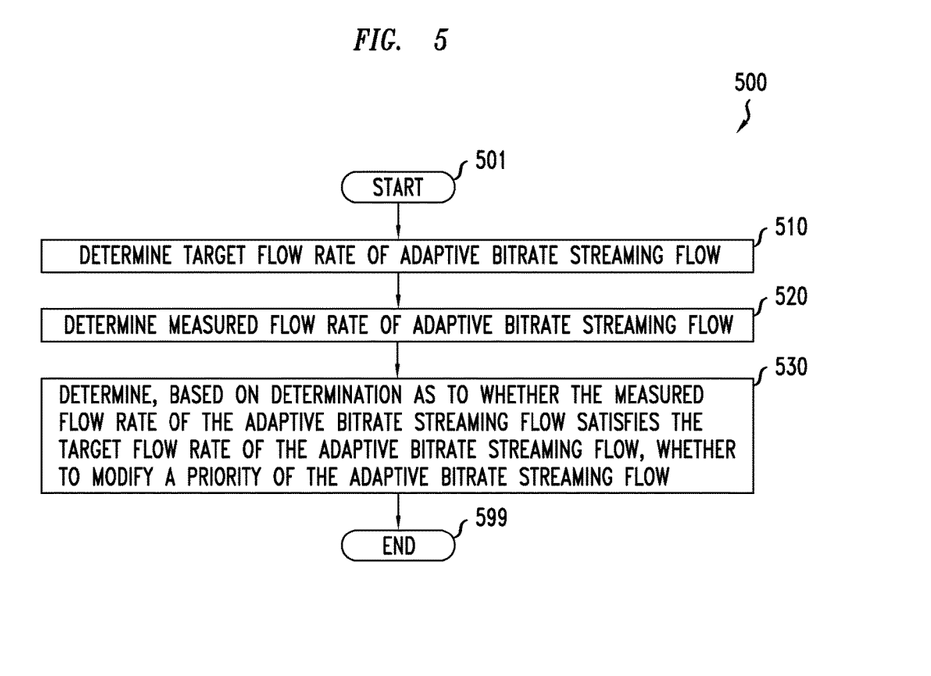
FIG. 5 depicts an embodiment of a method for dynamically controlling the priority level assigned to an adaptive bitrate streaming flow at a wireless access device

FIG. 5 depicts an embodiment of a method for dynamically controlling the priority level assigned to an adaptive bitrate streaming flow at a wireless access device. It will be appreciated that, although primarily presented as being performed serially, at least a portion of the blocks of method 500 may be performed contemporaneously or in a different order than as presented in FIG. 5. At block 501, method 500 begins. At block 510, a target flow rate of an adaptive bitrate streaming flow is determined. At block 520, a measured flow rate of the adaptive bitrate streaming flow is determined. At block 530, a determination is made, based on a determination as to whether the measured flow rate of the adaptive bitrate streaming flow satisfies the target flow rate of the adaptive bitrate streaming flow, as to whether to modify a priority of the adaptive bitrate streaming flow. In at least some embodiments, the determination as to whether to modify the priority of the adaptive bitrate streaming flow may be performed based on block 415 of method 400 of FIG. 4, based on blocks 415-455 of method 400 of FIG. 4, or the like. At block 599, method 500 ends.

Figure 6:
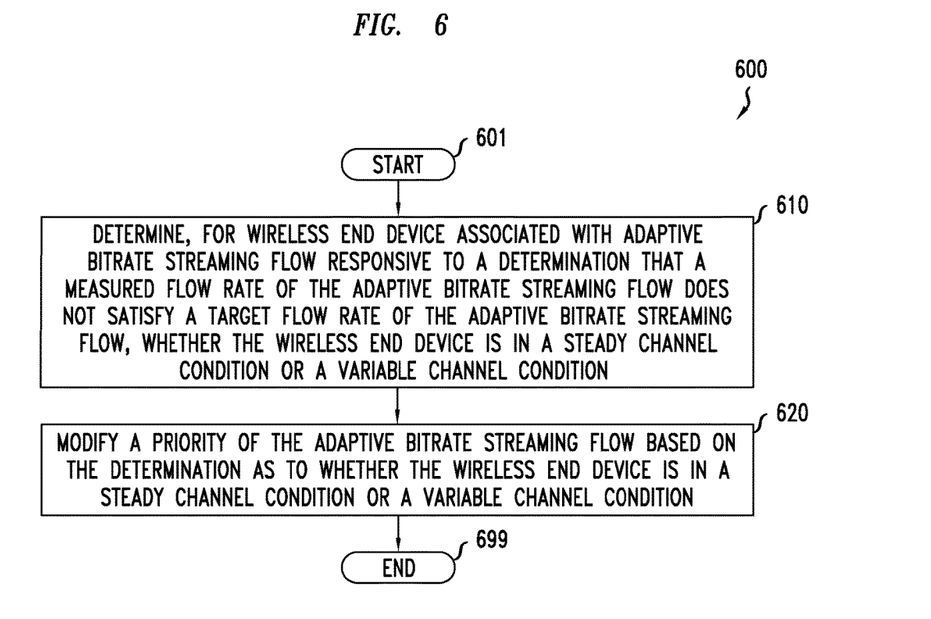
FIG. 6 depicts an embodiment of a method for dynamically controlling the priority level assigned to an adaptive bitrate streaming flow at a wireless access device.

FIG. 6 depicts an embodiment of a method for dynamically controlling the priority level assigned to an adaptive bitrate streaming flow at a wireless access device. It will be appreciated that, although primarily presented as being performed serially, at least a portion of the blocks of method 600 may be performed contemporaneously or in a different order than as presented in FIG. 6. At block 601, method 600 begins. At block 610, a determination is made, for a wireless end device associated with an adaptive bitrate streaming flow responsive to a determination that a measured flow rate of the adaptive bitrate streaming flow does not satisfy a target flow rate of the adaptive bitrate streaming flow, whether the wireless end device is in a steady channel condition or a variable channel condition. At block 620, the priority of the adaptive bitrate streaming flow is modified based on the determination as to whether the wireless end device is in a steady channel condition or a variable channel condition. In at least some embodiments, the modification of the priority of the adaptive bitrate streaming flow may be performed based on blocks 425-455 of method 400 of FIG. 4. At block 699, method 600 ends.

Various embodiments of the scheduling control capability may provide various other advantages or potential advantages. Various embodiments of the scheduling control capability may overcome limitations of existing radio access networks in that such existing radio access networks typically do not support special handling for streaming video traffic, either to improve QoE or to optimize SE, as streaming video is typically handled as an undifferentiated flow within a 'best effort' bearer. Various embodiments of the scheduling control capability may overcome limitations of existing guaranteed bitrate (GBR) solutions (e.g., GBR, Adaptive GBR (AGBR), or the like) of radio access networks, which typically can only guarantee bitrates over short durations without delivering the target flow rate needed for consistent QoE, which typically consume more wireless resources than should be needed to ensure good QoE (thus leaving less wireless resources for other flows), which typically depend on explicit signaling to identify video flows, which typically require explicit signaling for negotiating the setup of GBR bearers (e.g., where a video server may need to negotiate with the RAN for bearer setup, which may be particularly difficult for OTT video where there is neither a business relationship nor any technical control signaling between the video provider and the network provider), which typically require interaction with the video clients on the end user devices, and so forth. Various embodiments of the scheduling control capability may be configured to provide sustained throughput to clients irrespective of adverse conditions (e.g., congestion, poor channel conditions, or the like), including lowering the bitrate in a smooth, gradual manner in order to prevent rebuffering events. Various embodiments of the scheduling control capability may be configured to prevent or overcome events and conditions which may negatively impact QoE (e.g., stalls and rebuffering events which may occur due to client buffer exhaustion when the bits needed to sustain a certain bit rate are not delivered within the chunk interval, inconsistent quality which may be seen when the RDA on client jumps abruptly across various quality levels because it did not receive the previous chunks, long startup times (including the initial client buffer fill), or the like, as well as various combinations thereof). Various embodiments of the scheduling control capability may provide various other advantages or potential advantages.

Figure 7:
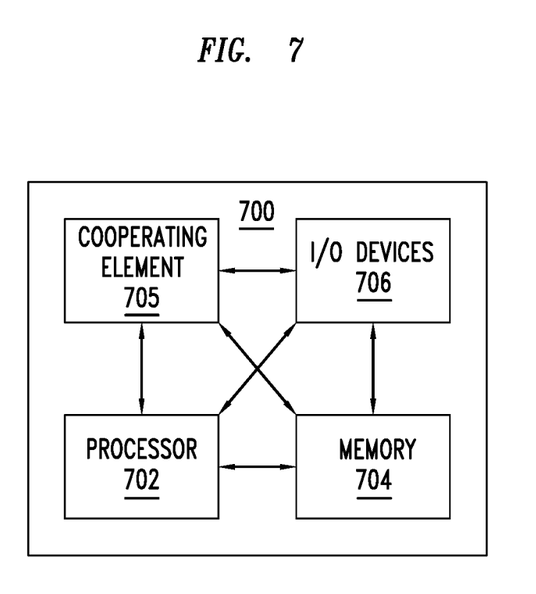
FIG. 7 depicts a high-level block diagram of a computer suitable for use in performing various functions described herein.

FIG. 7 depicts a high-level block diagram of a computer suitable for use in performing various functions presented herein.

The computer 700 includes a processor 702 (e.g., a central processing unit (CPU), a processor having a set of processor cores, a processor core of a processor, or the like) and a memory 704 (e.g., a random access memory (RAM), a read only memory (ROM), or the like). The processor 702 and the memory 704 are communicatively connected.

The computer 700 also may include a cooperating element 705. The cooperating element 705 may be a hardware device. The cooperating element 705 may be a process that can be loaded into the memory 704 and executed by the processor 702 to implement functions as discussed herein (in which case, for example, the cooperating element 705 (including associated data structures) can be stored on a non-transitory computer-readable storage medium, such as a storage device or other storage element (e.g., a magnetic drive, an optical drive, or the like)).

The computer 700 also may include one or more input/output devices 706. The input/output devices 706 may include one or more of a user input device (e.g., a keyboard, a keypad, a mouse, a microphone, a camera, or the like), a user output device (e.g., a display, a speaker, or the like), one or more network communication devices or elements (e.g., an input port, an output port, a receiver, a transmitter, a transceiver, or the like), one or more storage devices (e.g., a tape drive, a floppy drive, a hard disk drive, a compact disk drive, or the like), or the like, as well as various combinations thereof.

It will be appreciated that computer 700 of FIG. 7 may represent a general architecture and functionality suitable for implementing functional elements described herein, portions of functional elements described herein, or the like, as well as various combinations thereof. For example, computer 700 may provide a general architecture and functionality that is suitable for implementing all or part of one or more of adaptive bitrate streaming server 110, an adaptive bitrate streaming client device 120, wireless access device 131, scheduling element 135, or the like.

It will be appreciated that at least some of the functions depicted and described herein may be implemented in software (e.g., via implementation of software on one or more processors, for executing on a general purpose computer (e.g., via execution by one or more processors) so as to provide a special purpose computer, and the like) and/or may be implemented in hardware (e.g., using a general purpose computer, one or more application specific integrated circuits (ASIC), and/or any other hardware equivalents).

It will be appreciated that at least some of the functions discussed herein as software methods may be implemented within hardware, for example, as circuitry that cooperates with the processor to perform various functions. Portions of the functions/elements described herein may be implemented as a computer program product wherein computer instructions, when processed by a computer, adapt the operation of the computer such that the methods and/or techniques described herein are invoked or otherwise provided. Instructions for invoking the various methods may be stored in fixed or removable media (e.g., non-transitory computer-readable media), transmitted via a data stream in a broadcast or other signal bearing medium, and/or stored within a memory within a computing device operating according to the instructions.

It will be appreciated that the term "or" as used herein refers to a non-exclusive "or" unless otherwise indicated (e.g., use of "or else" or "or in the alternative").

It will be appreciated that, although various embodiments which incorporate the teachings presented herein have been shown and described in detail herein, those skilled in the art can readily devise many other varied embodiments that still incorporate these teachings.

What is claimed is:

1. An apparatus, comprising:
   at least one processor; and
   at least one memory including computer program code;
   wherein the at least one memory and the computer program code are configured to, with the at least one processor, cause the apparatus to at least:
      determine a target flow rate of an adaptive bitrate streaming flow;
      determine a measured flow rate of the adaptive bitrate streaming flow;
      determine, for a wireless end device associated with the adaptive bitrate streaming flow based on a determination that the measured flow rate does not satisfy the target flow rate, whether the adaptive bitrate streaming flow is associated with a variable channel condition;
      determine, for the wireless end device based on a determination that the adaptive bitrate streaming flow is associated with a variable channel condition, a signal-to-interference-and-noise ratio (SINR) associated with the adaptive bitrate streaming flow; and
      determine, based on the SINR associated with the adaptive bitrate streaming flow, whether to modify a priority of the adaptive bitrate streaming flow.

2. The apparatus of claim 1, wherein the target flow rate is determined based on an allocation of a maximum allocated flow rate available at a wireless access device among a set of adaptive bitrate streaming flows served by the wireless access device.

3. The apparatus of claim 1, wherein the target flow rate is determined based on at least one of a cell congestion status associated with a wireless access device or radio channel conditions associated with a wireless access device.

4. The apparatus of claim 1, wherein the measured flow rate is determined based on a chunk size of a chunk of the adaptive bitrate streaming flow and a chunk interval of the adaptive bitrate streaming flow.

5. The apparatus of claim 1, wherein the determination as to whether the adaptive bitrate streaming flow is associated with a variable channel condition is based on a variability of SINR measurements associated with the wireless end device.

6. The apparatus of claim 1, wherein, to determine whether to modify a priority of the adaptive bitrate streaming flow, the at least one memory and the computer program code are configured to, with the at least one processor, cause the apparatus to at least:
   determine whether the SINR associated with the adaptive bitrate streaming flow satisfies an SINR threshold.

7. The apparatus of claim 1, wherein the at least one memory and the computer program code are configured to, with the at least one processor, cause the apparatus to at least:
   increase the priority of the adaptive bitrate streaming flow based on a determination that the SINR associated with the adaptive bitrate streaming flow satisfies an SINR threshold.

8. The apparatus of claim 1, wherein the at least one memory and the computer program code are configured to, with the at least one processor, cause the apparatus to at least:

decrease the priority of the adaptive bitrate streaming flow based on a determination that the SINR associated with the adaptive bitrate streaming flow does not satisfy an SINR threshold.

9. A method, comprising:
determining, by an apparatus, a target flow rate of an adaptive bitrate streaming flow;
determining, by the apparatus, a measured flow rate of the adaptive bitrate streaming flow;
determining, by the apparatus for a wireless end device associated with the adaptive bitrate streaming flow based on a determination that the measured flow rate does not satisfy the target flow rate, whether the adaptive bitrate streaming flow is associated with a variable channel condition;
determining, by the apparatus for the wireless end device based on a determination that the adaptive bitrate streaming flow is associated with a variable channel condition, a signal-to-interference-and-noise ratio (SINR) associated with the adaptive bitrate streaming flow; and
determining, by the apparatus based on the SINR associated with the adaptive bitrate streaming flow, whether to modify a priority of the adaptive bitrate streaming flow.

10. An apparatus, comprising:
at least one processor; and
at least one memory including computer program code;
wherein the at least one memory and the computer program code are configured to, with the at least one processor, cause the apparatus to at least:
determine a target flow rate of an adaptive bitrate streaming flow;
determine a measured flow rate of the adaptive bitrate streaming flow;
determine, for a wireless end device associated with the adaptive bitrate streaming flow based on a determination that the measured flow rate does not satisfy the target flow rate, whether the wireless end device is in a steady channel condition or a variable channel condition;
determine, based on a determination that the wireless end device is in a steady channel condition, whether the wireless end device is in a good channel condition or a bad channel condition; and
modify a priority of the adaptive bitrate streaming flow based on the determination as to whether the wireless end device is in a good channel condition or a bad channel condition.

11. The apparatus of claim 10, wherein the determination as to whether the wireless end device is in a steady channel condition or a variable channel condition is based on a variability of signal-to-interference-and-noise ratio (SINR) measurements associated with the wireless end device.

12. The apparatus of claim 10, wherein the at least one memory and the computer program code are configured to, with the at least one processor, cause the apparatus to at least:
determine, based on a determination that the wireless end device is in a variable channel condition, a measured signal-to-interference-and-noise ratio (SINR) associated with the wireless end device; and
modify the priority of the adaptive bitrate streaming flow based on a determination as to whether the measured SINR associated with the wireless end device satisfies a threshold SINR.

13. The apparatus of claim 12, wherein the at least one memory and the computer program code are configured to, with the at least one processor, cause the apparatus to at least:
decrease the priority of the adaptive bitrate streaming flow based on a determination that the measured SINR associated with the wireless end device does not satisfy the threshold SINR.

14. The apparatus of claim 12, wherein the at least one memory and the computer program code are configured to, with the at least one processor, cause the apparatus to at least:
increase the priority of the adaptive bitrate streaming flow based on a determination that the measured SINR associated with the wireless end device satisfies the threshold SINR.

15. The apparatus of claim 10, wherein the at least one memory and the computer program code are configured to, with the at least one processor, cause the apparatus to at least:
increase the priority of the adaptive bitrate streaming flow based on a determination that the wireless end device is in a good channel condition.

16. The apparatus of claim 10, wherein the at least one memory and the computer program code are configured to, with the at least one processor, cause the apparatus to at least:
increase the priority of the adaptive bitrate streaming flow temporarily based on a determination that the wireless end device is in a bad channel condition.

17. The apparatus of claim 16, wherein the priority of the adaptive bitrate streaming flow is increased for only a fraction of a chunk interval of the adaptive bitrate streaming flow.

18. A method, comprising:
determining, by an apparatus, a target flow rate of an adaptive bitrate streaming flow;
determining, by the apparatus, a measured flow rate of the adaptive bitrate streaming flow;
determining, by the apparatus for a wireless end device associated with the adaptive bitrate streaming flow based on a determination that the measured flow rate does not satisfy the target flow rate, whether the wireless end device is in a steady channel condition or a variable channel condition;
determining, by the apparatus based on a determination that the wireless end device is in a steady channel condition, whether the wireless end device is in a good channel condition or a bad channel condition; and
modifying, by the apparatus, a priority of the adaptive bitrate streaming flow based on the determination as to whether the wireless end device is in a good channel condition or a bad channel condition.

* * * * *